United States Patent [19]

Phaneuf

[11] Patent Number: 4,521,725
[45] Date of Patent: Jun. 4, 1985

[54] SERIES SWITCHING REGULATOR

[75] Inventor: Charles A. Phaneuf, Stuart, Fla.

[73] Assignee: United Technologies Corporation, Hartford, Conn.

[21] Appl. No.: 557,676

[22] Filed: Dec. 2, 1983

[51] Int. Cl.³ .............................................. G05F 1/56
[52] U.S. Cl. .................................... 323/282; 323/285
[58] Field of Search ............... 323/282, 283, 284, 285, 323/286, 287, 901

[56] References Cited

U.S. PATENT DOCUMENTS

| 3,368,139 | 2/1968 | Wuerflein | 323/286 |
| 3,916,224 | 10/1975 | Daniels et al. | 307/265 |
| 4,263,644 | 4/1981 | Zellmer | 363/56 X |
| 4,350,948 | 9/1982 | Meroni | 323/282 |
| 4,430,608 | 2/1984 | Nesler | 323/282 |

Primary Examiner—Peter S. Wong
Attorney, Agent, or Firm—Dominic J. Chiantera

[57] ABSTRACT

A switching regulator with series gated switch includes a switching bus biased positively with respect to the signal ground of the source and regulated amplitude DC signals, and PWM circuitry with associated bootstrap circuitry connected between the source DC signal input and the switching bus.

4 Claims, 5 Drawing Figures

SERIES SWITCHING REGULATOR

DESCRIPTION

1. Technical Field

This invention relates to DC voltage regulators, and more particularly to pulse width modulated (PWM) switching regulators.

2. Background Art

PWM switching regulators are well known in the art for providing amplitude regulation of a DC signal by pulse modulating an uregulated DC signal at the duty cycle value necessary to produce an average PWM waveform value equal to the desired amplitude. The duty cycle intervals ($t_{on}$, $t_{off}$) are controlled to the signal difference magnitude (i.e. error signal) between the actual signal average value and a selected set point.

Pulsed switching of the unregulated signal is provided by a gate control switch in series with the regulator's input and output. The switch connects the unregulated signal to the switching regulator filter with alternate on (conducting) and off (nonconducting) states corresponding to the presence and absence, respectively, of an applied gate signal. The switch is typically a field effect transistor (FET). When gated on the FET must operate as a saturated switch minimizing the FET source to drain junction drop to maximize regulator efficiency. To achieve this the gate potential must be more positive than that of the source or drain. For an N type, enhancement mode FET, the gate must be driven 10 volts, or more, positive than either source or drain to achieve saturation. The drain, however, receives the source signal input which is the maximum positive signal amplitude within the regulator. As such, the prior art regulators obtain gate signal drive at higher positive amplitude than the unregulated input voltage signal by adding an auxiliary DC-to-DC converter. This provides an extra gate driving source, but draws additional power from the unregulated DC signal source and lowers overall regulator efficiency.

DISCLOSURE OF INVENTION

The object of the present invention is to provide a high efficiency series switching regulator for regulating the amplitude of a DC voltage signal between an output terminal and signal ground in response to a source DC voltage signal applied between an input terminal and signal ground, without use of an auxiliary gate signal drive.

According to the present invention, a switching regulator includes a series gated switch for connecting the regulator input terminal to a switching bus in response to gate signals presented thereto, the bus thereby receiving a PCM voltage signal, the regulator further including PWM circuitry, with associated bootstrap circuitry, connected between the regulator input terminal and the switching bus, the bootstrap circuitry including a storage capacitor for storing the regulated amplitude DC signal magnitude and providing to the PWM circuitry a voltage signal proportional to the sum of the switching bus PWM voltage signal and the regulated amplitude DC signal voltage as a gate drive signal to the series switch.

In further accord with the present invention the switching bus is connected through the gated series switch to the regulator input source DC voltage signal during each $t_{on}$ interval and is connected through a switching diode to signal ground during each $t_{off}$ interval, the bootstrap storage capacitor being recharged during $t_{off}$ to a difference voltage magnitude substantially equal to the regulated amplitude DC voltage signal.

The present PWM regulator provides high efficiency operation by maintaining saturation of the series pass switch with a resulting low junction voltage drop across the switch. This is provided by a bootstrap function which is amplified by the PWM voltage signal superimposed on the regulator's switching bus. With the bootstrap maintaining a difference voltage potential proportional to the regulated output voltage between the switching bus and the PWM gate drive, the switching bus potential boosts the difference voltage magnitude in each $t_{on}$ interval to provide a gate signal amplitude at least 10 VDC more positive than the source DC input signal.

These and other objects, features and advantages of the present invention will become more apparent in light of the following detailed description of a best mode embodiment thereof, as illustrated in the accompanying Drawing(s).

BRIEF DESCRIPTION OF THE DRAWING(S)

BEST MODE FOR CARRYING OUT THE INVENTION

Figure 3:
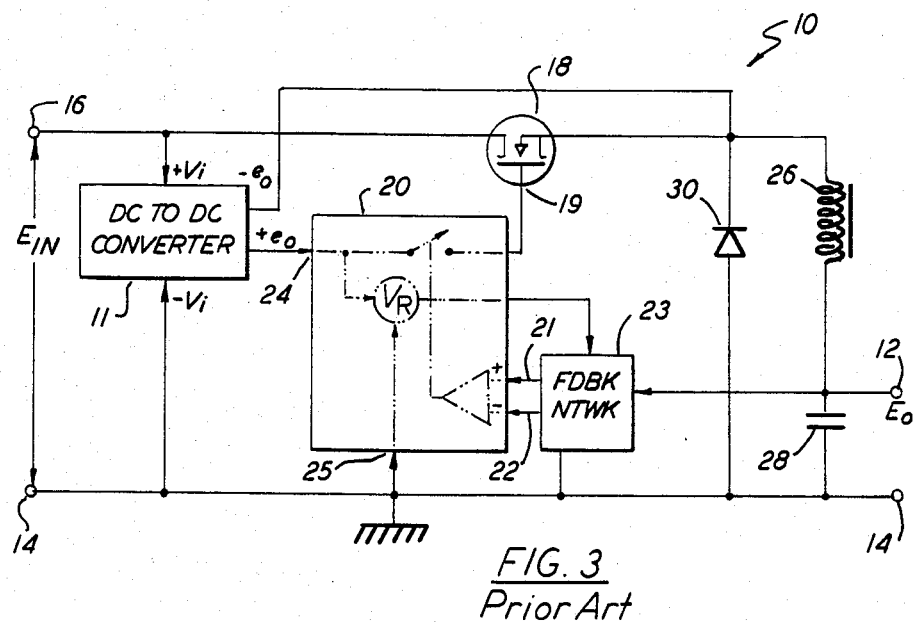
FIGS. 3 and 4 are simplified schematic illustrations of prior art PWM regulators.

FIG. 3 is a prior art switching regulator 10 for regulating, with auxiliary DC to DC converter 11, the DC signal amplitude $E_O$ between output terminal 12 and signal ground 14 by PWM of a source DC voltage signal $E_{IN}$ presented between input terminal 16 and ground. A gated switch 18, e.g. an N type FET, connects input (D) to output(s) at a gate input 19 signal frequency and duty cycle set by PWM circuitry 20 in dependence on a feedback signal on lines 21, 22 from network 23 responsive to the output. The PWM circuitry is connected at inputs 24, 25 between a high voltage signal $e_0$ from converter 11 and ground; the converter providing a drive signal to the FET gate that is more positive (nominally 10 VDC) than the FET drain (D).

In operation, the PWM circuitry drives the switch with the selected frequency PWM gate signal that "saturates" the FET drain to source junction, connecting, in PWM fashion, the source DC signal to the regulator output filter combination of series inductor 26 and filter capacitor 28. In each $t_{off}$ cycle of the PWM interval diode 30 provides the ringing current path for the inductor, which sources the filter capacitor and regulator output. Although the FET gate signal amplitude is sufficiently high to saturate the switch, thereby minimizing drain to source drop and maintaining $E_O$ regulation for low amplitude excursions of $E_{IN}$, the converter output $e_0$ tracks the high amplitude transients of input voltage. This may exceed the PWM circuit voltage limits, causing failure of the regulator. This is in addition to the loading of the input $E_{IN}$ by the converter, which reduces regulator efficiency.

Figure 4:
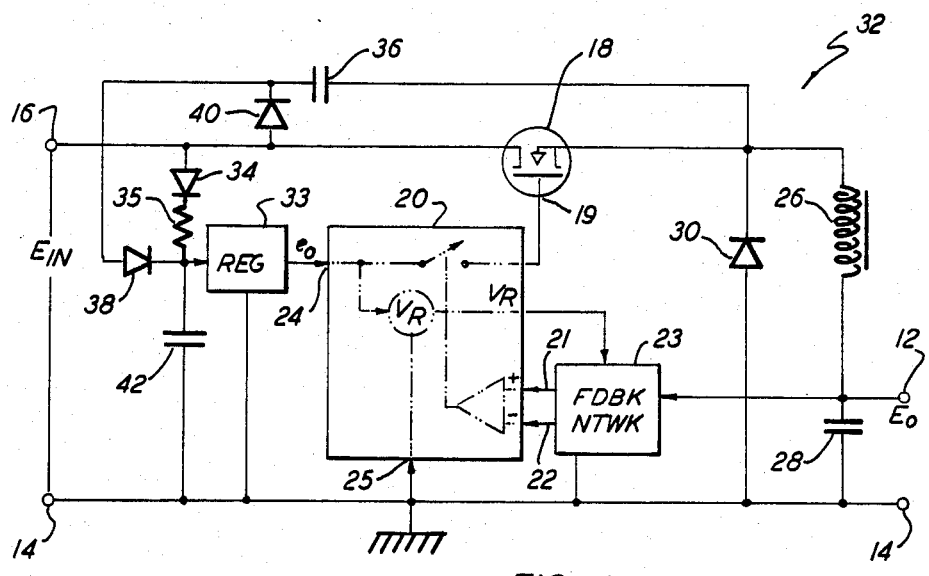
Figure 5:
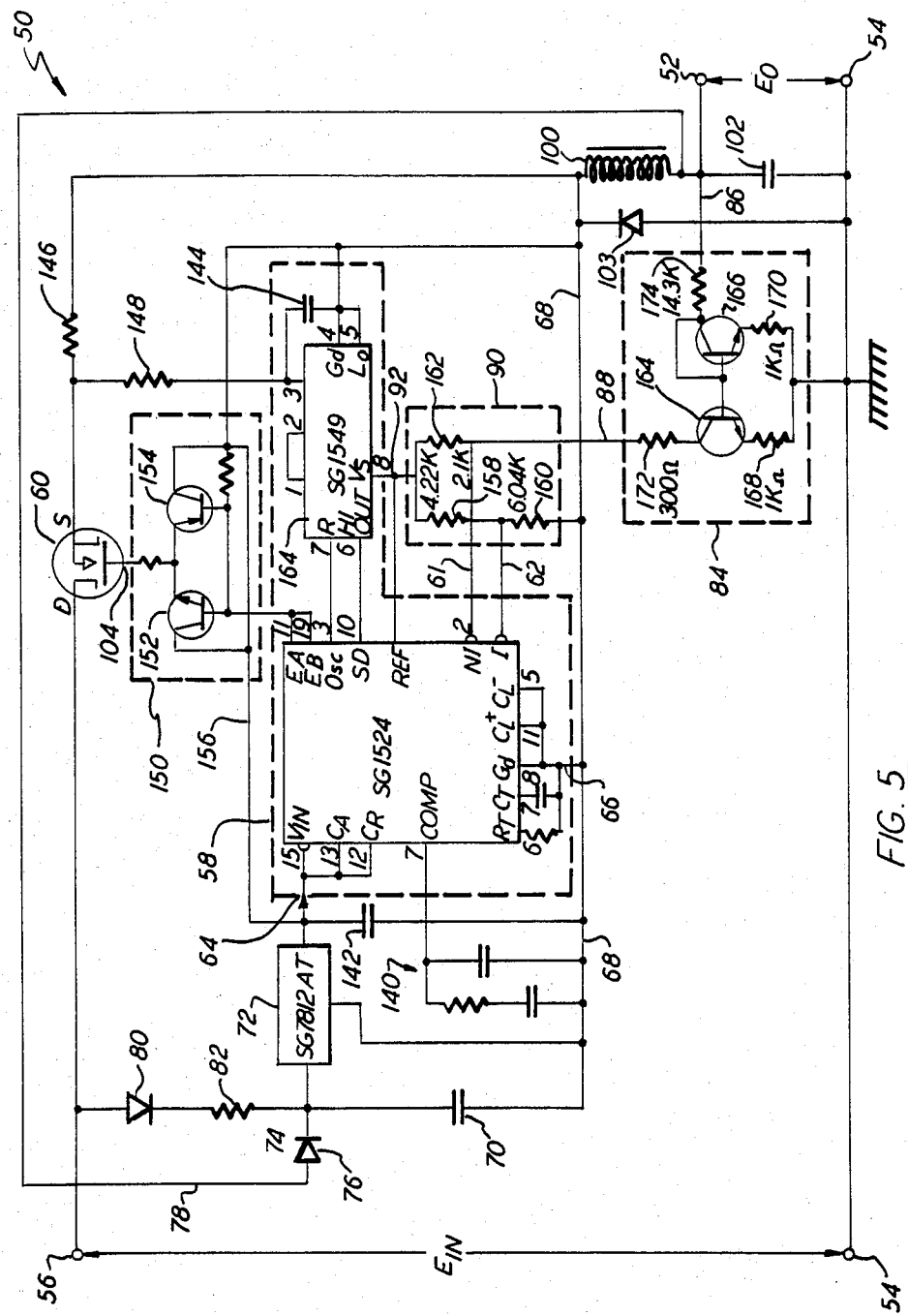
FIG. 5 is a detailed schematic diagram of a best mode embodiment of the PWM regulator of FIG. 1.

An alternative prior art regulator 32 is shown in FIG. 4, in which the auxiliary converter is replaced with internal bootstrap circuitry. The PWM circuit 20 receives the input voltage signal e₀ from preregulator 33; energized, alternately, through start-up diode 34 and resistor 35 connected to input terminal 16, and from a bootstrap capacitor 36 connected to the preregulator through threshold diode 38. The capacitor, with diode 40, doubles the preregulator input voltage, which is input filtered by capacitor 42. The preregulator reduces the bootstraps input voltage to a safe maximum for the PWM circuit, while still providing sufficient amplitude gate signals to saturate the FET for the nominal $E_{IN}$ input levels. However, the regulator cannot tolerate high input voltage levels, for these attenuate the FET drain to gate potential because the FET drive is fixed and referenced to ground. This reduces the regulators ability to saturate the FET, once again reducing regulator efficiency. In summary, the prior art regulators which do not obtain drive energy from the switched regulator output (FIG. 3) or are not bootstrapped to the source input voltage (FIG. 4) suffer dynamic range limits, in addition to loading the input so as to reduce regulator efficiency.

Figure 1:
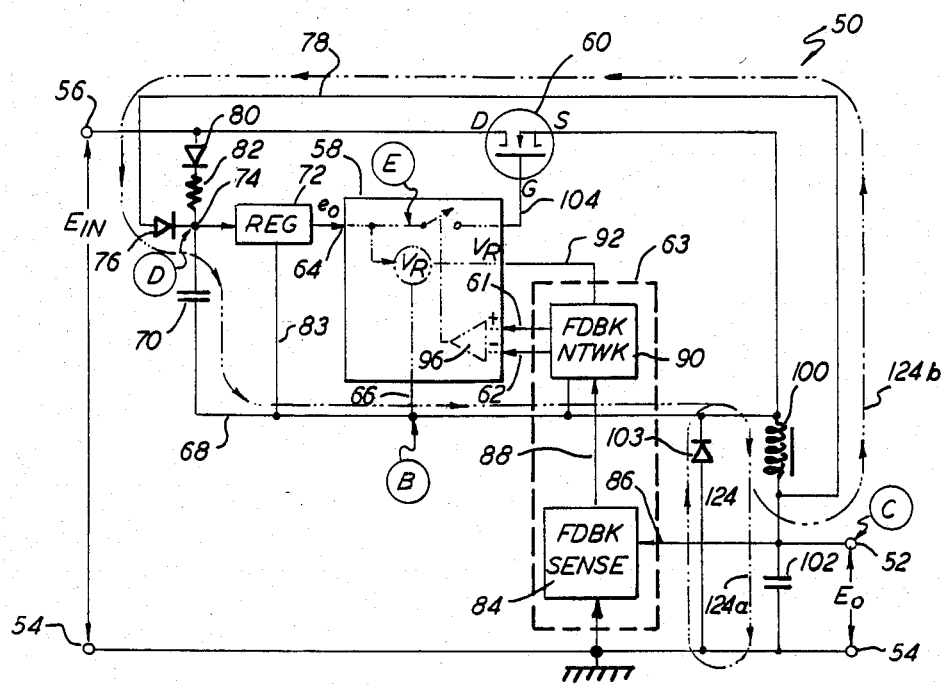
FIG. 1 is a simplified schematic illustration of a PWM regulator according to the present invention.

FIG. 1 is a simplified illustration of the present switching regulator 50 which provides a regulated amplitude DC signal $E_O$ between output terminal 52 and signal ground 54, in response to a source DC voltage signal $E_{IN}$ between input terminal 56 and signal ground. Pulse width modulator (PWM) 58 provides gate signal drive to switch 60 at a PWM duty cycle dependent on feedback signals on lines 61, 62 from feedback circuitry 63, and at an amplitude dependent on a high potential voltage signal ($e_O$) between a PWM high potential input 64 and a low potential input 66 connected to a switching bus 68. This is in contrast to the prior art regulators in which the PWM circuitry is connected to the same signal ground as the source input voltage. As described hereinafter, the bus receives the PWM source voltage peak amplitude; substantially equal to that of the source DC voltage $E_{IN}$.

The regulator 50 includes bootstrap circuitry with capacitor 70 connected between switching bus 68 and the e₀ preregulator 72 input at junction 74, and threshold diode 76 connected through line 78 between capacitor 70 and the regular output terminal 52. Similarly, start-up circuitry is included with diode 80 and resistor 82 connected together in series between the junction 74 and input terminal 56. Since junction 74 is subject to variations in the source DC voltage $E_{IN}$, the preregulator 72, with its common input connected through line 83 to bus 68, provides the regulated e₀ signal to PWM input 64.

The feedback circuitry 63, described in detail with respect to FIG. 4, includes feedback sense circuitry 84 connected through line 86 between signal ground 54 and output terminal 52. The sense circuitry provides a conditioned feedback signal on output line 88 representative of the actual amplitude of the regulated output. The feedback signal is presented to feedback network 90 which scales the signal and compares it with a reference set point value proportional to the reference voltage signal on line 92 from the modulator. The feedback signal and reference signal, are provided on lines 61, 62 to the modulator (error amplifier 96, shown in phantom) which controls the PWM duty cycle.

The regulator output filter includes inductor 100 connected in series between the switching bus 68 and output terminal 52, and filter capacitor 102 connected between the output terminal 52 and signal ground. Diode 103, with cathode connected to the switching bus and anode connected to signal ground 54, provides the return current path for the inductive current circulating through the load and capacitor 102 during each $t_{off}$ interval. As known, the combination LC values are selected in dependence on the PWM switching frequency to filter the PWM waveform, reducing output signal ripple. For a positive output regulated DC signal the gated, series pass switch 60 is preferably an N type, enhancement mode, FET connected as shown with the drain (D) connected to input terminal 56, the source (S) connected to the switching bus 68, and the gate terminal connected through line 104 to the modulator output.

Figure 2:
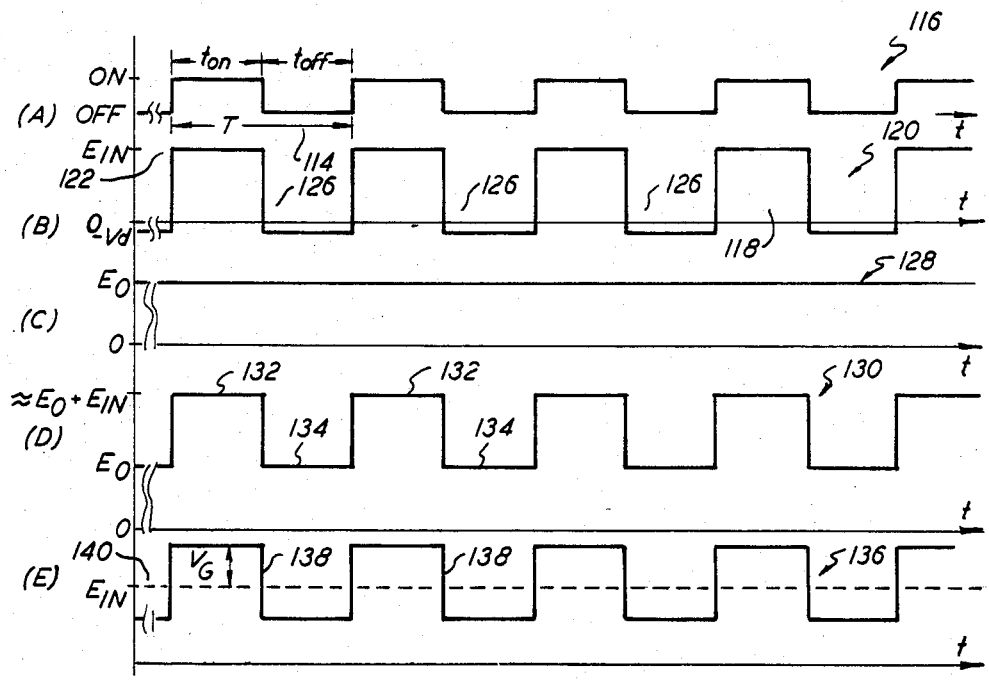
FIG. 2 is an illustration of operating waveforms used in the description of the PWM regulator of FIG. 1.

In operation, the modulator duty cycle control signal $t_{ON}$ and $t_{OFF}$ intervals in each PWM T is shown by signal waveform 116, FIG. 2, illustration A. During each t on interval the modulator provides a gate signal through line 104 to the switch 60, turning the switch on and connecting the source DC voltage $E_{IN}$ to the switching bus 68, as shown in FIG. 2, illustration B, by the on portion 118 of the switching bus waveform 120. The bus peak positive amplitude is approximately equal to that of the source DC signal; the difference being the source-to-drain junction voltage drop across the switch. The bus PWM signal is applied through inductor 100 to filter capacitor 102.

During each $t_{off}$ interval the switch 60 turns off removing $E_{IN}$ from the switching bus 68. Inductor 100 functions as a current source, recharging filter capcitor 102 and the bootstrap storage capacitor 70. Phantom line 124 shows the inductive current paths through the regulator (excluding regulator load): inductive current flow 124a through filter capacitor 102 and commutation diode 103 and back to the inductor, and inductive current flow 124b through signal line 78, diode 76, junction 74, and the bootstrap capacitor 70, back to the inductor. During $t_{off}$ diode 103 clamps the switching bus 68 at a diode junction voltage drop (Vd) from signal ground 54; a negative potential in the positive voltage regulator embodiment of FIG. 1, as shown in each off interval 126 of the switching bus waveform 120 (FIG. 2, illustration B). As such, the switching bus for a positive regulator alternates between a peak voltage potential, approximately $E_{IN}$, and a low potential, approximately signal ground, during the $t_{on}$ and $t_{off}$ intervals of each duty cycle signal period.

During the $t_{off}$ interval the bootstrap capacitor 70 charges to the regulated amplitude output $E_O$, (FIG. 2, illustration C) the voltage drop of diode 76 essentially cancelling that of commutation diode 103. During $t_{on}$ the input source DC voltage is connected to the bus, biasing capacitor 70 by the PWM peak amplitude to provide a voltage signal magnitude at junction 74 which approximately equals the sum of the PWM and regulated DC signal amplitudes, as shown by waveform 130 (FIG. 2, illustration D). The on portion 132 of waveform 130 shows the peak amplitude as the sum of both input and output amplitudes, with the off portion 134 approximately equal to the regulated amplitude output. In other words, the voltage at junction 74 is fixed with respect to bus 68 notwithstanding changes in $E_{IN}$, and tracks the input $E_{IN}$.

Preregulator 72 provides the controlled amplitude high potential signal e₀ to the PWM input 64. The regulated high potential input signal, shown in FIG. 2, illustration E by waveform 136, has a peak amplitude during the $t_{on}$ interval 138 which is less than the peak amplitude at junction 74, but greater than the source DC voltage peak amplitude, as shown by the difference magnitude $V_G$ between $E_{IN}$ (dashed line 140) and the signal peak. This difference is greater than the maximum gate to drain junction voltage required to maintain absolute saturation of the drain-to-source junction.

FIG. 4 is a detailed illustration of a best mode embodiment of the regulator 50 of FIG. 1 for a positive polarity output signal, and a PWM switching frequency of 20 KHZ. Elements which appear in FIG. 1 have the same reference numerals in FIG. 4. As shown, the modulator 58 comprises known proprietary components including an integrated circuit (IC) PWM, such as a Silicon General®SG1524, and an associated current limiting IC, such as the Silicon General SG1549. FIG. 4 illustrates the connections of each IC, by pin numbers, to peripheral components, such as compensation network 140, filter capacitors 142, 144 and current sense resistors 146, 148; the interconnections between IC's are also shown. The required components and connections are documented by the manufacturer and well known to those skilled in the art—for that reason they are not further discussed here. Furthermore, it should be understood that various other known, proprietary PWM circuits may be used as deemed necessary, or desirable, by those skilled in the art.

The embodiment of FIG. 4 includes gate switching circuitry 150 having complimentary drive pair transistors 152, 154, such as a PN3569 NPN and 2N3644 PNP transistors, respectively. The collectors of each transistor are connected through line 156 to the preregulator (72) high potential signal $e_0$. The preregulator may comprise a three terminal device, such as the Silicon General SG7812AT.

The PWM feedback signal on lines 61, 62 (the noninverting (NI) and inverting (I) inputs to the error amplifier of the SG1524) include a set point signal (line 61) and a sensed signal (line 62). The set point signal is derived in feedback network 90 by the reference signal voltage divider of resistors 158, 160 connected in series between the PWM reference signal output $V_{ref}$ (on line 92) and the switching bus 68. For a typical 5 VDC reference value the resistors 158, 160, are 2.1K and 6.04K to provide an approximate +3.71 VDC signal input to the I input, pin 1. Since the PWM low potential input is connected to the switching bus the bus PWM waveform (FIG. 2, illustration B) is superimposed on $V_{ref}$ such that the potential across the divider equals $V_{ref}$.

The sensed feedback signal on line 88 is a current signal which modulates the voltage drop across resistor 162 of network 90, which is also connected to $V_{ref}$. The current is modulated in amplitude in direct proportion to changes in amplitude of the regulated output $E_O$, by the feedback sense circuit current source including matched pair transistors 164, 166, emitter resistors 168, 170 connected to signal ground 54, and collector resistors 172, 174 connected to line 88 and output terminal 52, respectively. In the positive polarity embodiment the transistors are known NPN types. Transistor 164 acts as the current source; transistor 166 with collector to base short functions as a diode from the base of transistor 164, to provide temperature compensation. The changes in $E_O$ are coupled through the divider of resistors 170, 174 to the base of transistor 164 which changes the collector voltage accordingly, so as to change the current through resistor 162 and the voltage on line 61 to the PWM circuitry.

The remaining elements of the FIG. 4 embodiment function in the same manner described hereinbefore, with respect to FIG. 1. The bootstrap capacitor 70 is preferably a high capacitance value. For the 20 KHZ PWM frequency it may be on the order of 120 microfarads; typically a wet slug capacitor having a 50 VDC working voltage for an 18–30 VDC input voltage and 16 VDC regulated output voltage. Similarly, the filter capacitor 102 is on the order of 4000 microfarads and inductor 100 is on the order of 280 microhenries.

With the self-generated, bootstrap gate signal drive the present switching regulator achieves efficiencies in excess of ninety percent overall, with efficiencies better than ninety-nine percent at the low input voltage (18 VDC) with 22.5 watt output. Similarly, the output amplitude regulation is better than one percent for input voltages between 18 and 90 VDC and output loads of 22 to 98 watts.

Although the invention has been shown and described with respect to a best mode embodiment thereof, it should be understood by those skilled in the art that various other changes, omissions and additions in the form and detail thereof, may be made therein, without departing from the spirit and scope of the invention.

That which I claim and desire to secure by Letters Patent, is:

1. Series switching voltage regulator responsive to a source DC voltage signal received between an input terminal and signal ground, for providing a regulated amplitude DC voltage signal between an output terminal and signal ground, comprising:

output filter means, including inductor means connected between the output terminal and a switching bus means;

gated switch means, having a signal input connected to the source DC voltage signal at the regulator input terminal, a signal output connected to said switching bus, and a gate terminal, said gated switching means alternatively connecting and disconnecting the source DC voltage signal to said switching bus in response to a pulse width modulated (PWM) gate signal presented to said gate terminal;

feedback sensing means, for providing a feedback signal indicative of the actual value of the regulated amplitude DC voltage signal;

pulse width modulator means, having a low voltage potential input connected to said switching bus and a high voltage potential input responsive to high voltage potential signals provided thereto from a summing junction, said modulator means responsive to said feedback signal and said high potential signal for providing, in dependence on said feedback signal magnitude, said PWM gate signal to said switch means at a signal amplitude proportional to said high potential signal amplitude; and bootstrap circuit means, including storage capacitor means responsive to the difference voltage magnitude between said switching bus and said summing junction for storing said difference voltage therein, and signal coupling means connected between said summing junction and the regulator output terminal for maintaining said difference voltage magnitude stored in said storage capacitor means at a minimum value substantially equal to said regulated amplitude DC voltage value, said bootstrap circuit providing to said summing junction, in the presence of each of said gate signals, said high potential signal at an amplitude greater than the source DC signal amplitude, whereby said gate signal amplitude to said switch means gate terminal is greater than said source DC signal amplitude at said switch means signal input.

2. The regulator of claim 1, further comprising:
preregulator means responsive to signals at said summing junction for providing said high potential signal to said modulator means high potential input at a low signal impedance.

3. The regulator of claim 1, wherein
said switching bus is at a positive PWM voltage potential with respect to signal ground; and
said gated switch comprises an N type field effect transistor.

4. The regulator of claim 1, wherein
said feedback sensing means senses the actual value of the regulated amplitude DC voltage signal at the output terminal with respect to signal ground, and provides said feedback signal to said modulator means at a feedback signal amplitude measured with respect to said modulator means low voltage potential input.

* * * * *

UNITED STATES PATENT AND TRADEMARK OFFICE
CERTIFICATE OF CORRECTION

PATENT NO. : 4,521,725

DATED : June 4, 1985

INVENTOR(S) : CHARLES A. PHANEUF

It is certified that error appears in the above-identified patent and that said Letters Patent is hereby corrected as shown below:

Column 5, Line 45: after "reference" insert --signal--

Column 6, Line 42: after "means" change "alternatively" to --alternately--

Signed and Sealed this

Third Day of September 1985

[SEAL]

Attest:

DONALD J. QUIGG

Attesting Officer     Acting Commissioner of Patents and Trademarks - Designate